United States Patent
Suzuki et al.

[11] Patent Number: 5,652,678
[45] Date of Patent: Jul. 29, 1997

[54] ZOOM LENS SYSTEM WITH FUNCTION FOR REDUCING VIBRATION

[75] Inventors: Kenzaburo Suzuki, Tokyo; Haruo Sato, Kawasaki, both of Japan

[73] Assignee: Nikon Corporation, Tokyo, Japan

[21] Appl. No.: 608,961

[22] Filed: Feb. 29, 1996

Related U.S. Application Data

[63] Continuation of Ser. No. 250,385, May 27, 1994, abandoned.

[30] Foreign Application Priority Data

May 31, 1993 [JP] Japan ................................. 5-149725

[51] Int. Cl.$^6$ ................. G02B 27/64; G02B 15/14
[52] U.S. Cl. ................. 359/557; 359/554; 359/676; 359/691
[58] Field of Search .................. 359/554, 557, 359/676–677, 683–685, 691, 708, 738–740

[56] References Cited

U.S. PATENT DOCUMENTS

| | | | |
|---|---|---|---|
| 4,907,868 | 3/1990 | Kitagishi et al. | 359/557 |
| 5,000,549 | 3/1991 | Yamazaki | 359/557 |
| 5,069,537 | 12/1991 | Kitagishi | 359/557 |
| 5,168,403 | 12/1992 | Umeda et al. | 359/557 |
| 5,182,671 | 1/1993 | Kitagishi et al. | 359/557 |
| 5,270,857 | 12/1993 | Oizumi et al. | 359/554 |
| 5,559,635 | 9/1996 | Sato | 359/557 |

OTHER PUBLICATIONS

"Photography Industry" vol. 49, No. 8 p. 551 (Aug. 1991).

*Primary Examiner*—Thong Nguyen
*Attorney, Agent, or Firm*—Shapiro and Shapiro

[57] ABSTRACT

A zoom lens with a function for reducing vibration, comprises in the order from an object side a first lens group having a negative refracting power and a second lens group movable in a direction traversing an optical axis and having a positive refracting power. When varying a focal length from a wide-angle end to a telephoto end, the first lens group moves non-linearly, and the second lens group moves toward the object side. The zoom lens also comprises a displacing device for reducing vibration by moving the second lens group in the direction traversing the optical axis. The zoom lens satisfies the following conditions:

$$\Delta Y = (1-\beta_2) \cdot \Delta S$$

$$\Delta Smax/f2 < 0.1$$

where $\Delta S$ is the magnitude of a vibration reduction moving quantity of the second lens group, $\beta_2$ is the imaging magnification of the second lens group, $\Delta Y$ is the magnitude of an image moving quantity corresponding thereto, f2 is the focal length of the second lens group, and $\Delta Smax$ is the magnitude of the maximum vibration reduction displacement quantity of the second lens group when correcting an image blur.

19 Claims, 4 Drawing Sheets

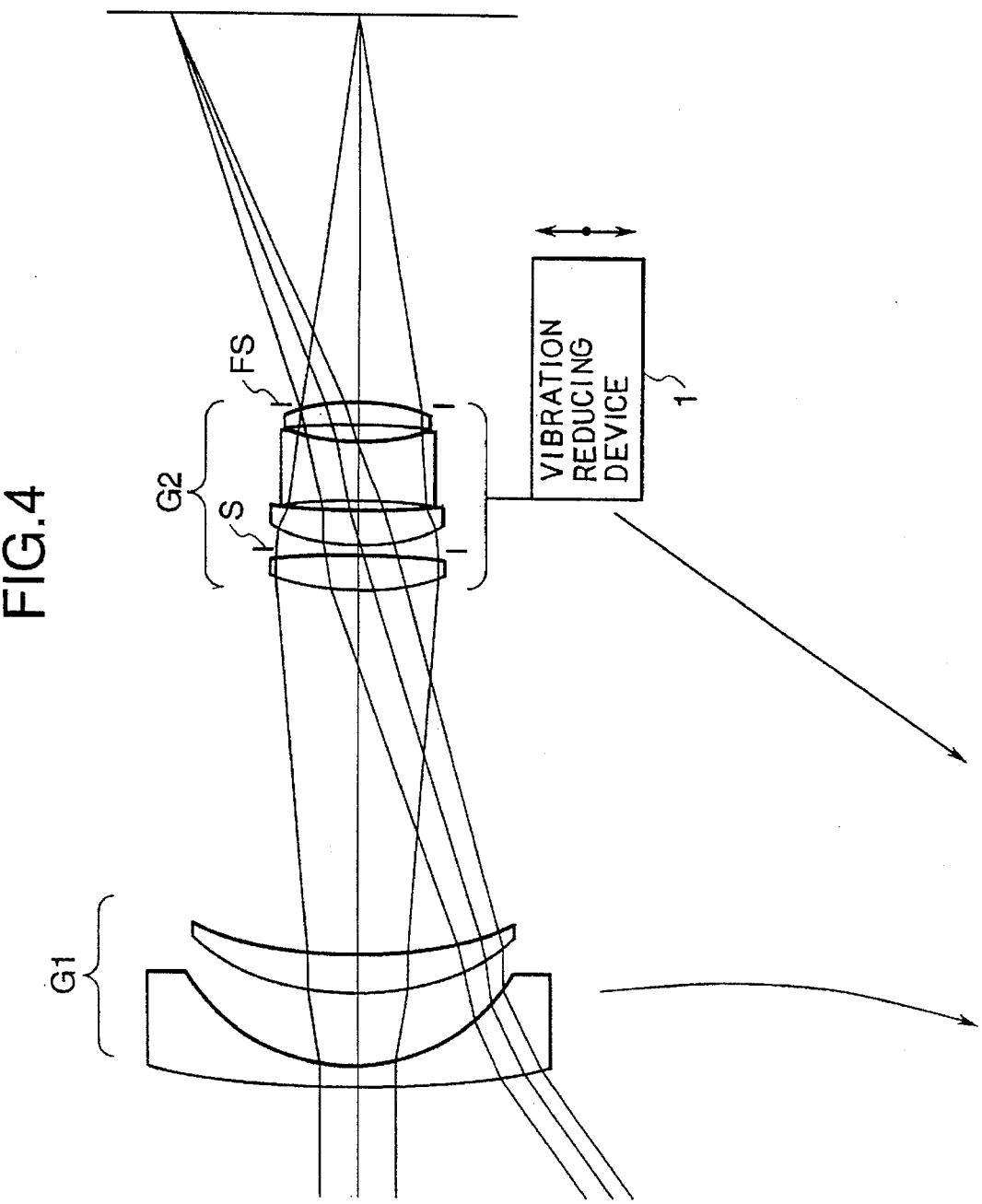

ZOOM LENS SYSTEM WITH FUNCTION FOR REDUCING VIBRATION

This is a continuation of application Ser. No. 08/250,385 filed May 27, 1994, now abandoned.

BACKGROUND OF THE INVENTION

1. Field of the Invention

The present invention relates generally to a zoom lens system incorporating a function to reduce a camera vibration and, more particularly, to a zoom lens system suitable for photography.

2. Related Background Art

In recent years, a variety of zoom lenses have been newly proposed. There have been also proposed a multiplicity of zoom lenses including a vibration reduction optical system for correcting an image blur due to vibrations of the zoom lens.

For instance, U.S. Pat. No. 5,069,537 discloses a method of stabilizing an image by way of an embodiment of a zoom lens constructed of two lens groups, i.e., a first lens group having a negative refracting power and a second lens group having a positive refracting power.

According to the prior art disclosed in U.S. Pat. No. 5,069,537, there is presented nothing but the theoretical image stabilizing method aiming at the zoom lens in an intermediate telephoto range in which the focal length is approximately 100 mm or larger. Nothing about the characteristics of aberrations was absolutely elucidated based on a specific lens construction. Namely, the above prior art did not provide a zoom lens incorporating a desired imaging performance.

As described above, a small number of the conventional zoom lenses incorporating the function for reducing vibration exhibit a sufficient imaging performance. The disadvantage is that a still smaller number of zoom lenses have the function for reducing vibration and the imaging performance enough for use in the standard range particularly for 35 mm photos.

SUMMARY OF THE INVENTION

The present invention, which has been devised in view of the problems described above, aims at providing a zoom lens exhibiting excellent imaging and vibration reduction performances and adapted from a wide-angle range to the standard range.

Briefly stated, a zoom lens system with a function for reducing vibration according to the invention comprises, sequentially from an object side: a first lens group having a negative refracting power and a second lens group movable in a direction traversing an optical axis for stabilizing an image, and having a positive refracting power. The zoom lens system of the present invention satisfies conditions that provide optimal correction of image blur and optimal imaging performance in general.

BRIEF DESCRIPTION OF THE DRAWINGS

Other objects and advantages of the present invention will become apparent during the following discussion in conjunction with the accompanying drawings, in which:

FIG. 4 is a view illustrating a layout of a zoom lens in accordance with a fourth embodiment of this invention.

DETAILED DESCRIPTION OF THE INVENTION

Figure 1:
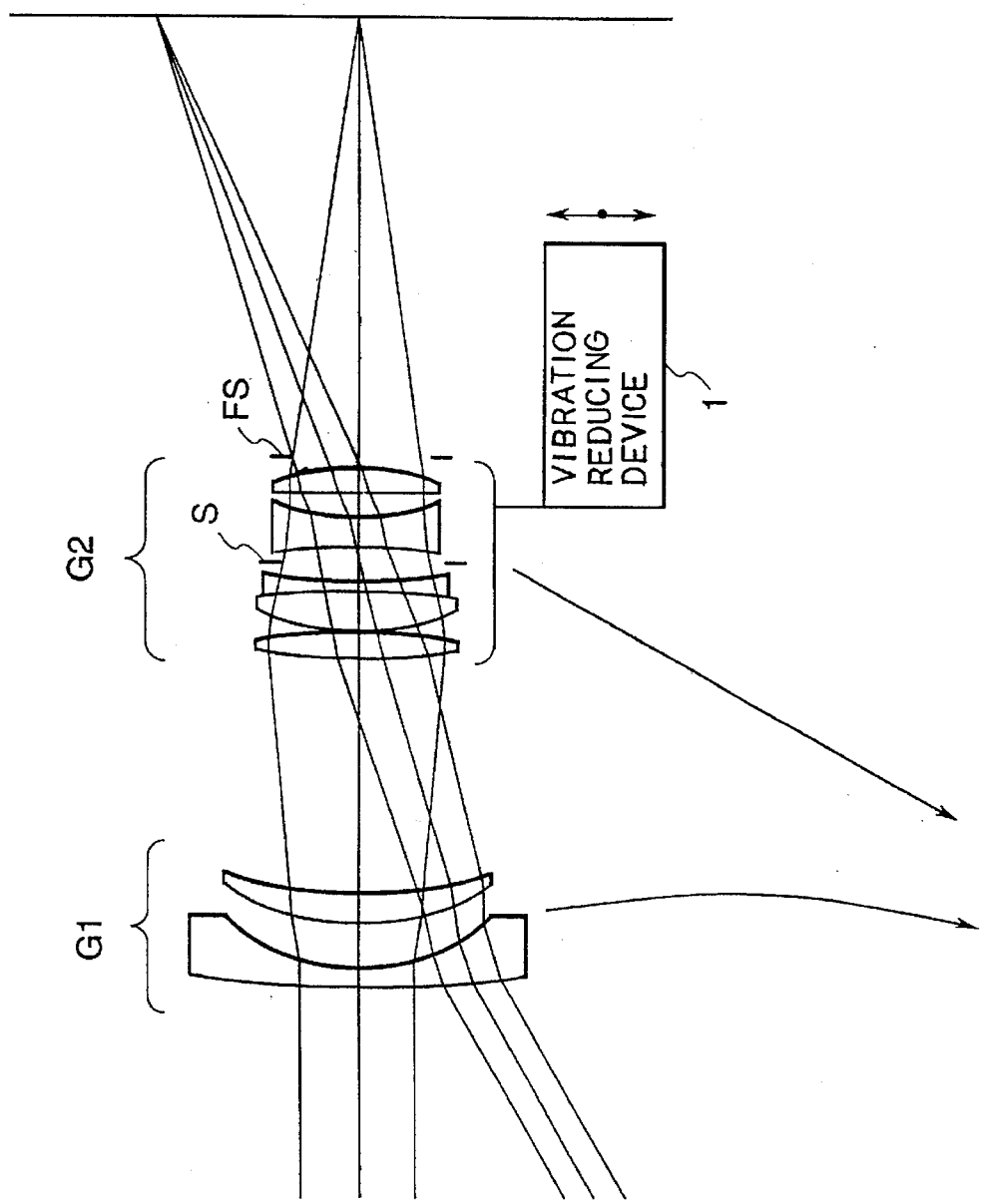
FIG. 1 is a view illustrating a layout of a zoom lens in accordance with a first embodiment of this invention.

According to one aspect of the present invention, there is provided a zoom lens system with a function for reducing vibration comprising, sequentially from an object side, a first lens Group having a negative refracting power; a second lens group movable along in a direction traversing an optical axis and having a positive refracting power; and a vibration reducing device for moving the second lens group in the direction traversing the optical axis. The vibration reducing device displaces the second lens group, thereby correcting an image blur. The first lens group, when varying a focal length from a wide-angle end to a telephoto end, moves along the optical axis so as to depict a non-linear locus, while the second lens group moves toward the object side. The zoom lens system satisfies the following conditions:

$$\Delta Y = (1-\beta_2) \cdot \Delta S$$

$$\Delta S max \cdot f2 < 0.1$$

where $\Delta S$ : the moving quantity for stabilizing the image of the second lens group, $\beta_2$ : the imaging magnification of the second lens group, $\Delta Y$ : the image moving quantity corresponding to the movement of the second lens group, f2 : the focal length of the second lens group, and $\Delta S max$ : the maximum displacement quantity which can be taken by the second lens group when correcting the image blur.

According to another aspect of the present invention, there is provided a zoom lens system with a function for reducing vibration comprising, sequentially from an object side: a first lens group having a negative refracting power; and a second lens group movable along a direction traversing an optical axis for stabilizing an image and having a positive refracting power. The first lens group, when varying a focal length from a wide-angle end to a telephoto end, moves along the optical axis so as to depict the non-linear loci, while the second lens group moves toward the object side. The zoom lens system satisfies the following conditions:

$$\Delta Y = (1-\beta_2) \cdot \Delta S$$

$$\Delta S max \cdot f2 < 0.1$$

where $\Delta S$ : the moving quantity for stabilizing the image of the second lens group, $\beta_2$ : the imaging magnification of the second lens group, $\Delta Y$ : the image moving quantity corresponding to the movement of the second lens group, f2 : the focal length of the second lens group, and $\Delta S max$ : the maximum displacement quantity which can be taken by the second lens group when correcting the image blur.

According to still another aspect of the present invention, there is provided a zoom lens system with a function for reducing vibration, comprising sequentially from an object side: a first lens group having a negative refracting power; and a second lens group having a positive refracting power. The first lens group moves along the optical axis so as to depict the non-linear loci when varying a focal length from a wide-angle end to a telephoto end, and the second lens group moving toward the object side. The zoom lens system further comprises a vibration reducing device for reducing vibration by moving the second lens group in the direction traversing the optical axis. The zoom lens system satisfies the following conditions:

$$\Delta Y = (1 - \beta_2) \cdot \Delta S$$

$$\Delta Smax / f2 < 0.1$$

where $\Delta S$ : the moving quantity for stabilizing the image of the second lens group, $\beta_2$ : the imaging magnification of the second lens group, $\Delta Y$ : the image moving quantity corresponding to the movement of the second lens group, f2 : the focal length of the second lens group, and $\Delta Smax$ : the maximum displacement quantity which can be taken by the second lens group when correcting the image blur.

According to further aspect of the present invention, there is provided a zoom lens system with a function for reducing vibration, comprising in the order from an object side: a first lens group having a negative refractive power; a second lens Group having a positive refractive power. The first lens Group and the second lens group, when varying a focal length from a wide-angle end to a telephoto end, move along an optical axis. The second lens group includes a positive lens unit, the positive lens unit moving along a direction traversing the optical axis.

As in the case of the zoom lens according to the present invention, a zoom lens is constructed of two lens groups, i.e., a first lens group G1 having a negative refracting power and a second lens group G2 having a positive refracting power. This zoom lens is capable of, though small in terms of the number of its lens groups and relatively simple in terms of construction of each lens group, obtaining a good imaging performance and is therefore widely employed.

The construction of the whole zoom lens is, however, of a so-called retrofocus type and therefore exhibits a tendency to have a large total length as compared with its focal length. Especially in the telephoto range where the focal length exceeds 100 mm, the total length is too large. Besides, a whole lens aperture is too large, resulting in an extreme increase in size of the zoom lens enough to be unsuitable for utilization. Consequently, the above zoom lens constructed of the two lens groups is usable with the photographic lens from the wide-angle range to the standard range.

The present invention is concerned with an improvement of the above 2-group-based zoom lens, wherein conditions optimal to the zoom lens incorporating the function for reducing vibration are employed.

According to the present invention, the vibration reducing method involves properly moving a lens group (or a single lens) consisting of a plurality of lenses in a direction substantially orthogonal to the optical axis. That is, the vibration reducing method involves properly moving the lens group or the lens by a predetermined quantity to correct an image blur derived from the movement of the whole zoom lens along the optical axis because of a camera vibration.

In general, when comparing a lens aperture of the first lens group with a lens aperture of the second lens group, the lens aperture of the second lens group can be made smaller than the former. Therefore, according to the present invention, the vibration is reduced by moving the second lens group in the direction substantially orthogonal to the optical axis. Namely, the second lens group is constructed as a vibration reduction correction optical system, thereby avoiding increases in terms of sizes of a holding mechanism and a driving mechanism as well.

Moreover, in the present invention, the lens group which moves in a direction traversing the optical axis for reducing vibration is not only the whole second lens group but also at least one positive lens element in the second lens group.

Further, it is preferable that a fixed flare stop is provided on the optical axis separately from the aperture stop in order to intercept unnecessary beams of incident light when the second lens group is displaced across the optical axis for reducing the vibration.

According to the vibration reducing method of the present invention, a relationship expressed by the following mathematical expression (1) is established between a magnitude of moving quantity of the second lens group G2 defined as a vibration reduction correction lens group in the direction orthogonal to the optical axis and a magnitude of image moving quantity corresponding to the movement of the second lens group G2.

$$\Delta Y = (1 - \beta_2) \cdot \Delta S \qquad (1)$$

where $\Delta S$ : the magnitude of moving quantity of the second lens group for reducing the vibration, $\beta_2$ : the imaging magnification of the second lens group, and $\Delta Y$ : the magnitude of corresponding image moving quantity.

The mathematical expression (1) is a relational expression important for constructing the Vibration reducing system as a whole. In the mathematical expression (1), a value of the imaging magnification $\beta_2$ varies corresponding to each zoom position. It is, however, possible to obtain the value of the imaging magnification in an arbitrary zoom position by combining a device such as an encoder with a memory.

Thus, a desired moving quantity and speed of the lens group that are required for correcting the image blur are calculated in real time by applying the mathematical expression (1). This calculation is based on the imaging magnification $\beta_2$ obtained with respect to the arbitrary zoom position and the measured image blur. The vibration reducing device 1 serving as the displacing device causes the second lens group G2 to move by the thus calculated desired moving quantity and speed in the direction orthogonal to the optical axis, thereby correcting the image blur.

Moreover, according to the present invention, there is satisfied a relationship shown in the following conditional expression (2):

$$\Delta Smax / f2 < 0.1 \qquad (2)$$

where f2 : the focal length of the second lens group and $\Delta Smax$: the magnitude of the maximum displacement quantity of the second lens group when reducing the vibration.

The conditional expression (2) intended to define a proper range of the magnitude of the maximum moving quantity of the second lens group G2 when reducing the vibration with respect to the focal length of the second lens group G2.

If over a value of an upper limit of the conditional expression (2), the moving quantity of the second lens group G2 at the vibration reduction increases, and, as a result, a fluctuation quantity of aberration undesirably becomes too large. Particularly, there disadvantageously increases a difference (an astigmatic difference) in the optical axis direction between the best image surface in a meridional direction in a peripheral range on the image surface and the best image surface in a sagittal direction.

Further, in the above-mentioned construction of the present invention, it is desirable to satisfy the following conditional expression (3):

$$0.3 < f2/(fW \cdot fT)^{1/2} < 1.2 \quad (3)$$

where
  $f2$ : the focal length of the second lens group
  $fW$ : the focal length of the whole zoom lens system at the wide-angle end,
  $fT$ : the focal length of the whole zoom lens system at the telephoto end.

The conditional expression (3) intended to define a proper range with respect to the focal length of the second lens group G2 for effecting the vibration reduction correction.

If over a value of an upper limit of the conditional expression (3), the focal length of the second lens group G2 increases, and the total length of the zoom lens disadvantageously becomes too large. Besides, in general, the aperture stop S provided in the second lens group and the lenses constituting the second lens group disadvantageously become too large.

Whereas if under a value of a lower limit of the conditional expression (3), the focal length of the second lens group G2 becomes too small, with the result that an interval with respect to the first lens group G1 is narrowed. For this reason, it is difficult to secure a space for the lens movement necessary for varying a focal length. As a result, it is disadvantageously difficult to secure a sufficient zoom ratio. In addition, a Petzval's sum easily shifts on the positive side, and a good imaging performance can not be obtained because of a curvature of the image.

Incidentally, it is preferable that a value of the upper limit is 0.9, while a value of the lower limit is 0.5.

For the purpose of attaining even better imaging and vibration reduction performances, in addition to the conditional expression (3), it is preferable to satisfy the following conditional expression (4):

$$fT < 100 \text{ mm} \quad (4)$$

where
  $fT$ : the focal length of the whole zoom lens system at the telephoto end.

The zoom lens according to this invention is of the retrofocus type in terms of the whole configuration and exhibits such a tendency that the total length thereof increases as compared with its focal length. Accordingly, as stated before, if over the value of the upper limit, and when entering the telephoto range where the focal length exceeds 100 mm, the total length becomes too large. Besides, the whole lens aperture also increases excessively. It follows that the zoom lens remarkably increases in size enough to be unsuitable for the utilization.

As a matter of fact, when constructing the second lens group G2, in addition to the above-mentioned various conditions, it is preferable to satisfy the conditional expressions (5) through (7):

$$0.7 < f2_+/f2 < 2 \quad (5)$$

$$0 < q < 1 \quad (6)$$

$$1.45 < n_+ \quad (7)$$

where
  $n_+$ : the refractive index of the convex lens closest to the image side in the second lens group G2,
  $f2_+$ : the focal length of the object-side convex lens, and
  $q$ : the shape factor of the object-side convex lens.

If over a value of an upper limit of the conditional expression (5), the disadvantages are caused, wherein the local length of the convex lens closest to the object side in the second lens Group G2 becomes too large; the spherical aberration easily becomes excessive on the positive side; and the Petzval's sum also easily becomes excessive on the positive side.

Whereas if under a value of a lower limit of the conditional expression (5), the disadvantages are produced, wherein the focal length of the convex lens closest to the object side in the second lens Group G2 becomes too small; the spherical aberration becomes too excessive in the negative side; and the Petzval's sum also easily becomes excessive on the positive side.

When deviating from s range defined by the upper and lower limit values of the conditional expression (6), the spherical aberration becomes excessive on the negative side, with the result that the Good imaging performance can not be obtained. Further, there disadvantageously excessively increases a deviation between a focal position (a position of the image surface) in a state where the second lens Group G2 moves in the direction orthogonal to the optical axis and a focal position in a state where the second lens group G2 does not move.

Note that the shape factor q is defined such as $q=(rb+ra)/(rb-ra)$, where $ra$ is the radius of curvature of the lens surface on the object side of the lens, and $rb$ is the radius of curvature of the lens surface on the image side of the lens.

If under a value of a lower limit of the conditional expression (7), the Petzval's sum of the whole zoom lens easily shifts on the negative side, and, disadvantageously, quantities of the astigmatism and the distortion of the image surface become excessive.

More specifically, in addition to the above-mentioned various conditions, it is preferable to satisfy the following conditional expressions (8) and (9) in order to secure the good imaging and vibration reduction performances.

$$0.3 < |f2_-|/f2 < 1.5 \quad (8)$$

$$0.2 < r_-/f2 < 1 \quad (9)$$

where
  $f2_-$ : the focal length of the concave lens closest to the image in the second lens Group, and
  $r_-$ : the radius of curvature of the image-side surface of the concave lens on the image side.

If above a value of an upper limit of the conditional expression (8), the following disadvantages are caused. The focal length of the concave lens closest to the image side in the second lens group G2 becomes too large. The spherical aberration easily becomes excessive on the negative side. The Petzval's sum also easily becomes excessive. The quantities of the astigmatism and the distortion of the image surface become tremendous, and, at the same time, the distortion also easily transits on the negative side.

Whereas if under a lower limit value of the conditional expression (8), the following disadvantages are induced. The focal length of the concave lens closest to the image side in the second lens group G2 becomes too small. The spherical aberration becomes excessive on the positive side. The Petzval's sum also easily becomes excessive on the positive side. The quantities of the astigmatism and the distortion of the image surface become tremendous, and, at the same time, the distortion easily transits on the positive side.

If above an upper limit value of the conditional expression (9), the disadvantage is caused, wherein the distortion at the wide-angle end becomes excessive on the negative side. Additional disadvantages are that fluctuations of the comatic aberration come to a tremendous level, and particularly an inward comatic aberration is caused in beams of light higher than the principal beam of light. A still additional disadvantage is that the imaging performance remarkably declines in the peripheral range of the picture when reducing the vibration.

Whereas if under a lower limit value of the conditional expression (9), the following disadvantages are produced. The distortion at the telephoto end becomes excessive on the positive side. The fluctuations of the comatic aberration become tremendous, and especially an outward comatic aberration is produced in beams of light lower than the principal beam of light. The imaging performance remarkably declines in the peripheral range of the picture when reducing the vibration.

For securing a more favorable performance, in addition to the variety of conditions given above, it is preferable that the imaging magnification $\beta_2$ of the second lens group G2 satisfies the following condition:

$$-1.8 < \beta_2 < -0.4 \qquad (10)$$

Moreover, in addition to the above-stated various conditions, it is preferable to satisfy the following conditional expressions (11) and (12) in terms of securing the good imaging function and a function for reducing vibration.

$$0.35 < f2/fT < 0.6 \qquad (11)$$

$$-0.8 < f1/fT < -0.5 \qquad (12)$$

At the telephoto end of the zoom lens, the aberration produced in the object-side portion of the whole zoom lens is expanded by an optical system disposed posterior thereto. This leads to an easy-to-decline imaging performance. For this reason, when determining distribution of the focal length of the whole zoom lens, it is preferable to satisfy the conditional expressions (11) and (12).

If above an upper limit value of the conditional expression (11), the following disadvantages are caused. A conjugate length of the second lens group G2 increases. Further, the spherical aberration also becomes excessive on the negative side. Whereas if under a lower limit value of the conditional expression (11), the interval between the first lens group G1 and the second lens group G2 is narrowed, and the interval enough to vary the focal length is hard to obtain. Additionally, the back-focal length is also hard to obtain at the wide-angle end.

If above an upper limit value of the conditional expression (12), the disadvantages are produced, wherein the curvature of the image surface and the astigmatism become excessive, and the distortion also becomes excessive on the negative side. Whereas if under a lower limit value of the conditional expression (12), in addition to such a disadvantage that the curvature of the image surface and the astigmatism become excessive, the spherical aberration easily transits on the negative side.

When actually constructing the lens system, in addition to the various conditions given above, it is preferable to satisfy the following constructive conditions.

The first lens group G1 comprises a negative meniscus lens with a convex surface toward the object side and a positive meniscus lens with a convex surface toward the object side. It is desirable to have an aspherical surface for the sake of the good imaging function and a function for reducing vibration. Particularly, it is preferable in terms of correcting the aberration that the aspherical surface is formed on the image-side surface of the negative meniscus lens.

On the other hand, a desirable layout of the second lens group G2 is that a positive lens is disposed on the object side; and a positive lens, a negative lens and a convex lens are disposed subsequent thereto toward the image side.

Moreover, the refractive index of the negative lens in the second lens group G2 is preferably 1.7 or greater. Besides, the so-called aperture stop S is disposed preferably in the second lens group G2 or between the first and second lens groups G1, G2.

DESCRIPTION OF THE PREFERRED EMBODIMENTS

Each of embodiments of the present invention will hereinafter be described with reference to the drawings. A zoom lens system in each embodiment according to the present invention comprises, sequentially from an object side, a first lens group G1 having a negative refracting power and a second lens group G2 having a positive refracting power. Then, when varying a focal length from a wide-angle end to a telephoto end, the first lens group G1 moves along an optical axis so as to trace non-linear loci.

Further, the zoom lens system in each embodiment comprises a displacing device 1 for moving the second lens group G2 in a direction substantially orthogonal to the optical axis. The displacing device 1 may involve an application of a device disclosed in, e.g., commonly owned U.S. Patent application Ser. No. 08/628,192 (filed Apr. 5, 1996) Further, the displacing device in each embodiment according to the present invention includes an encoder and a memory to obtain an imaging magnification $\beta_2$ of the second lens group G2. The encoder detects a position of the second lens group G2 in the optical-axis direction. The memory stores a value of the imaging magnification $\beta_2$ corresponding to the position of the second lens group G2. The displacing device 1 is thereby capable of obtaining the value of the imaging magnification $\beta_2$ at that time on the basis of the position, detected by the encoder, of the second lens group G2.

[First Embodiment]

FIG. 1 is a view illustrating a layout of the zoom lens in the embodiment 1 of this invention. The illustrated zoom lens comprises, sequentially from the object side, the first lens group G1 and the second lens group G2. The first lens group G1 is constructed of a negative meniscus lens with a convex surface toward the object side and a positive meniscus lens with a convex surface toward the object side. The second lens group G2 is constructed of a biconvex lens and a cemented lens unit of a biconvex lens and a biconcave lens. The second lens group G2 is also constructed of a biconcave lens and a biconvex lens. Note that an aperture stop S is provided in the second lens group G2. Further, a fixed flare stop FS is provided between the second lens group G2 and an image plane but closer to an image side of the second lens group G2. The flare stop FS intercepts unnecessary beams of light when the second lens group G2 moves in the direction substantially orthogonal to the optical axis to reduce a vibration.

FIG. 1 shows a positional relationship between the respective lens groups at the wide-angle end. When varying the focal length to the telephoto end, the lens groups move on the optical axis along zooming loci as indicated by arrowheads in the Figure. The second lens group G2 is properly moved in the direction substantially orthogonal to the optical axis by means of a vibration reducing device 1 defined as a displacing device, thereby correcting an image blur due to vibrations of the zoom lens.

The following Table (1) shows values of data of the embodiment 1 according to the present invention. In Table (1), f represents the focal length, DO is the distance along the optical axis between an object and the lens surface of the zoom lens system closest to the object, $F_{NO}$ is the F-number, $2\omega$ is the view angle, and Bf is the back-focal distance. Further, the numeral at the left end designates the order of each lens surface from the object side, r is the radius of curvature of each lens surface, d is the interval between the lens surfaces, n is the refractive index, and DO is the distance on the optical axis from the object to the lens surface closest to the object side.

An aspherical surface is expressed by the following mathematical expression (a):

$$S(y)=(y^2/R)/[1+(1-k\cdot y^2/R^2)^{1/2}]+C_2\cdot y^2+C_4\cdot y^4+C_6\cdot y^6+C_8\cdot y^8+C_{10}\cdot y^{10} \quad (a)$$

where y is the height in the direction perpendicular to the optical axis, S(y) is the displacement quantity in the optical-axis direction at the height y, R is the fiducial radius of curvature, k is the cone coefficient, and Cn is the nth-order aspherical surface coefficient.

Further, a paraxial curvature radius r of the aspherical surface is defined by the following mathematical expression (b):

$$r=1/(2\cdot C_2+1/R) \quad (b)$$

The aspherical surface in Table of data in each embodiment is marked with (*) on the right side of the surface number.

TABLE 1 f = 36.0–68.0
$F_{NO}$ = 3.32–4.65
$2\omega$ = 63.48°–35.04°

| | r | d | n |
|---|---|---|---|
| 1 | 161.395 | 1.700 | 1.77279 |
| 2* | 17.499 | 5.000 | |
| 3 | 25.389 | 3.000 | 1.75520 |
| 4 | 55.617 | (d4 = variable) | |
| 5 | 52.870 | 2.500 | 1.62041 |
| 6 | −98.697 | 0.100 | |
| 7 | 19.159 | 4.100 | 1.65160 |
| 8 | −120.000 | 1.100 | 1.64831 |
| 9 | 67.006 | 3.100 | |
| 10 | −59.885 | 2.800 | 1.72825 |

TABLE 1-continued

| 11 | 18.799 | 2.400 | |
| 12 | 137.320 | 2.600 | 1.61293 |
| 13 | −23.437 | (Bf) | |

(Aspherical Data)

| k | $C_2$ | $C_4$ |
|---|---|---|
| 2 | 0.3481 | 0.0000 | 6.2810 × 10⁻⁶ |

| $C_6$ | $C_8$ | $C_{10}$ |
|---|---|---|
| 2 | 2.6310 × 10⁻⁸ | −1.0750 × 10⁻¹⁰ | 3.0790 × X 10⁻¹³ |

(Variable Interval in Varying Focal Length)

| f | 36.000 | 68.000 |
|---|---|---|
| D0 | ∞ | ∞ |
| d4 | 23.611 | 0.291 |
| Bf | 45.511 | 67.911 |

(Condition Corresponding Values)

f2 = 35
fW = 36
fT = 68
ΔSmax = 0.096
$r_-$ = 18.799
$f2_-$ = −19.3565
$f2_+$ = 55.845

(2) ΔSmax/f2 = 0.0027
(3) f2/(fW · fT)$^{1/2}$ = 0.707
(5) $f2_+/f2$ = 1.595571
(6) q = 0.3024
(7) $n_+$ = 1.62041
(8) |$f2_-$|/f2 = 0.553
(9) $r_-$/f2 = 0.537

(Reduced Vibration Data)

| | Wide-Angle End | Telephoto End |
|---|---|---|
| Moving Quantity of Second Lens Group in Direction Orthogonal to Optical Axis (mm) | 0.070 | 0.096 |
| Image Moving Quantity (mm) | 0.120 | 0.227 |

[Second Embodiment]

Figure 2:
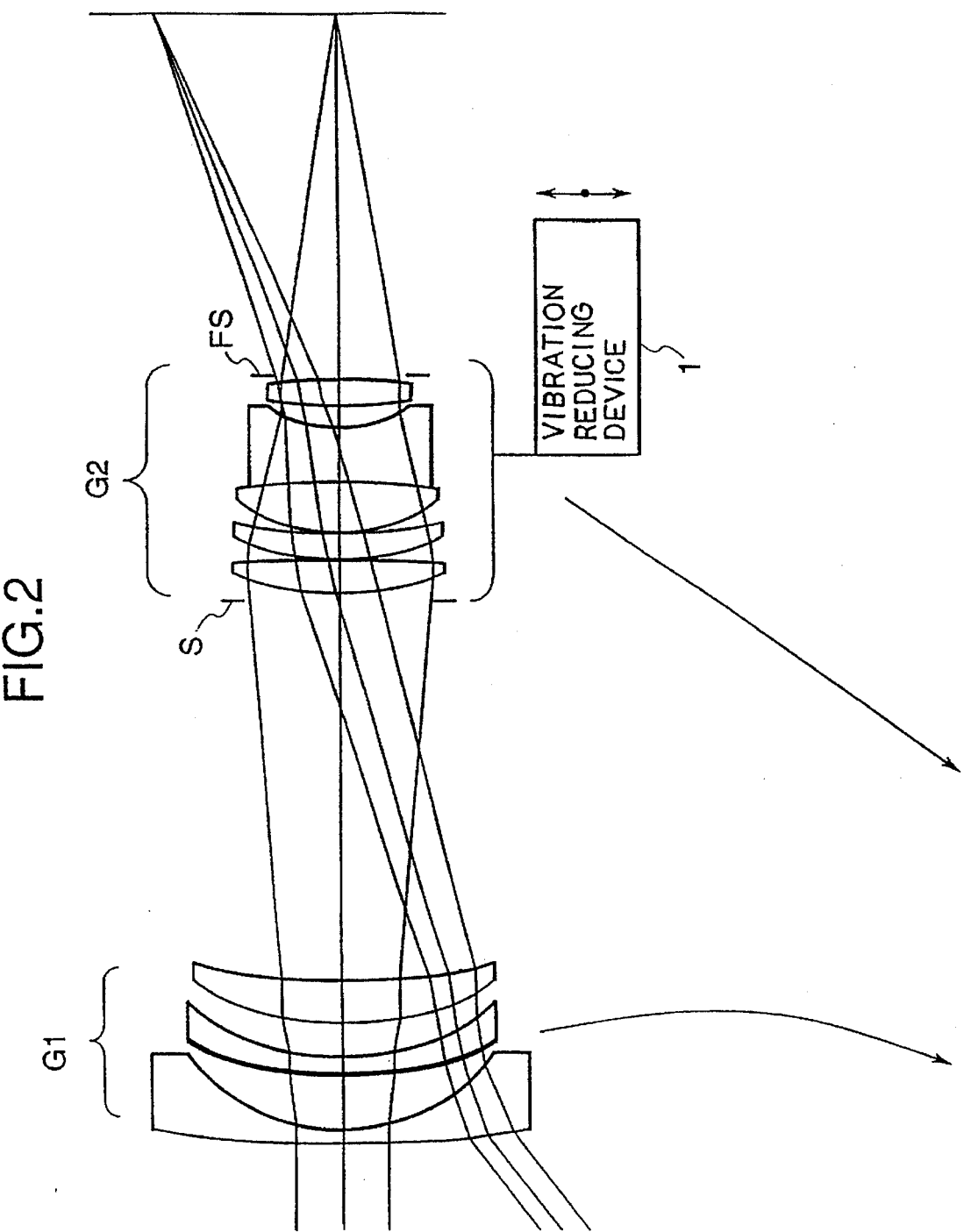
FIG. 2 is a view illustrating a layout of a zoom lens in accordance with a second embodiment of this invention.

FIG. 2 is a view illustrating a layout of the zoom lens in the embodiment 2 of this invention. The illustrated zoom lens comprises, sequentially from the object side, the first lens group G1 and the second lens group G2. The first lens group G1 is constructed of a negative meniscus lens with a convex surface toward the object side, a negative meniscus lens with a convex surface toward the object side and a positive meniscus lens with a convex surface toward the object side. The second lens group G2 is constructed of a biconvex lens, a positive meniscus lens with a convex surface toward the object side, a cemented lens unit of a biconvex lens and a biconcave lens and a biconvex lens. Note that the aperture stop S is provided between the first lens group G1 and the second lens group G2 but closer to the object side of the second lens Group G2. Further, the fixed flare stop FS is provided between the second lens group G2 and the image plane but immediately behind the second lens group G2. The flare stop FS intercepts unnecessary beams of light when the second lens group G2 moves in the direction substantially orthogonal to the optical axis to reduce a vibration.

In the second embodiment illustrated in FIG. 2, an aspherical layer with an aspherical surface toward the object side is provided on the convex surface toward the object side of the second lens element, i.e., the negative meniscus lens of the first lens group G1. The aspherical layer comprises, for example, a transparent layer.

FIG. 2 shows a positional relationship between the respective lens groups at the wide-angle end. When varying the focal length to the telephoto end, the lens groups move on the optical axis along the zooming loci as indicated by arrowheads in the Figure. The second lens group G2 is properly moved in the direction substantially orthogonal to the optical axis by means of a vibration reducing device 1 defined as a displacing device, thereby correcting an image blur due to vibrations of the zoom lens.

The zoom lens in the embodiment 2 has the same basic construction as the zoom lens in the embodiment 1 discussed above. Shown therein, however, is an example where the zoom lens is slightly extended on the wide-angle side, but a refracting power and a configuration of each lens group are different.

The following Table (2) shows values of data of the embodiment 2 according to the present invention. In Table (2), f represents the focal length, DO is the distance along the optical axis between an object and the lens surface of the zoom lens system closest to the object, $F_{NO}$ is the F-number, $2\omega$ is the view angle, and Bf is the back-focal distance. Further, the numeral at the left end designates the order of each lens surface from the object side, r is the radius of curvature of each lens surface, d is the interval between the lens surfaces, n is the refractive index, and DO is the distance on the optical axis from the object to the lens surface closest to the object side

TABLE 2

$f = 28.8–68.0$
$F_{NO} = 3.60–4.67$
$2\omega = 76.54°–35.02°$

| | r | d | n |
|---|---|---|---|
| 1 | 170.105 | 1.800 | 1.77279 |
| 2 | 22.643 | 5.800 | |
| 3* | 66.081 | 0.030 | 1.49712 |
| 4* | 66.081 | 1.970 | 1.50137 |
| 5 | 28.484 | 4.100 | |
| 6 | 34.056 | 5.400 | 1.68893 |
| 7 | 167.762 | (d7 = variable) | |
| 8 | 38.648 | 4.000 | 1.48749 |
| 9 | −99.695 | 0.100 | |
| 10 | 29.616 | 3.100 | 1.48749 |
| 11 | 63.582 | 0.100 | |
| 12 | 20.736 | 5.500 | 1.46450 |
| 13 | −86.892 | 7.100 | 1.80384 |
| 14 | 16.370 | 2.500 | |
| 15 | 167.074 | 3.000 | 1.56732 |
| 16 | −37.834 | (Bf) | |

(Aspherical Data)

| | k | $C_2$ | $C_4$ |
|---|---|---|---|
| 3 | 1.0000 | 0.0000 | $7.8690 \times 10^{-6}$ |
| 4 | 1.0000 | 0.0000 | $7.8690 \times 10^{-6}$ |

| | $C_6$ | $C_8$ | $C_{10}$ |
|---|---|---|---|
| 3 | $4.9740 \times 10^{-9}$ | $1.8843 \times 10^{-11}$ | $4.6657 \times 10^{-14}$ |
| 4 | $4.9740 \times 10^{-9}$ | $1.8843 \times 10^{-11}$ | $4.6657 \times 10^{-14}$ |

(Variable Interval in Varying Focal Length)

| f | 28.800 | 68.000 |
|---|---|---|
| DO | ∞ | ∞ |
| d7 | 42.961 | 3.235 |

TABLE 2-continued

| Bf | 41.107 | 57.546 |
|---|---|---|

(Condition Corresponding Values)

$f2 = 39.314$
$fW = 28.8$
$fT = 68$
$\Delta Smax = 0.096$
$r_- = 16.370$
$f2_- = -44.420$
$f2_+ = 57.678$ (2) $\Delta Smax/f2 = 0.00247$
(3) $f2/(fW \cdot ft)^{1/2} = 0.888$
(5) $f2_+/f2 = 1.46711$
(6) $q = 0.4413$
(7) $n_+ = 1.48749$
(8) $|f2_-|/f2 = 1.1299$
(9) $r_-/f2 = 0.416$ (Reduced Vibration Data)

| | Wide-Angle End | Telephoto End |
|---|---|---|
| Moving Quantity of Second Lens Group in Direction Orthogonal to Optical Axis (mm) | 0.061 | 0.096 |
| Image Moving Quantity (mm) | 0.096 | 0.227 |

[Third Embodiment]

Figure 3:
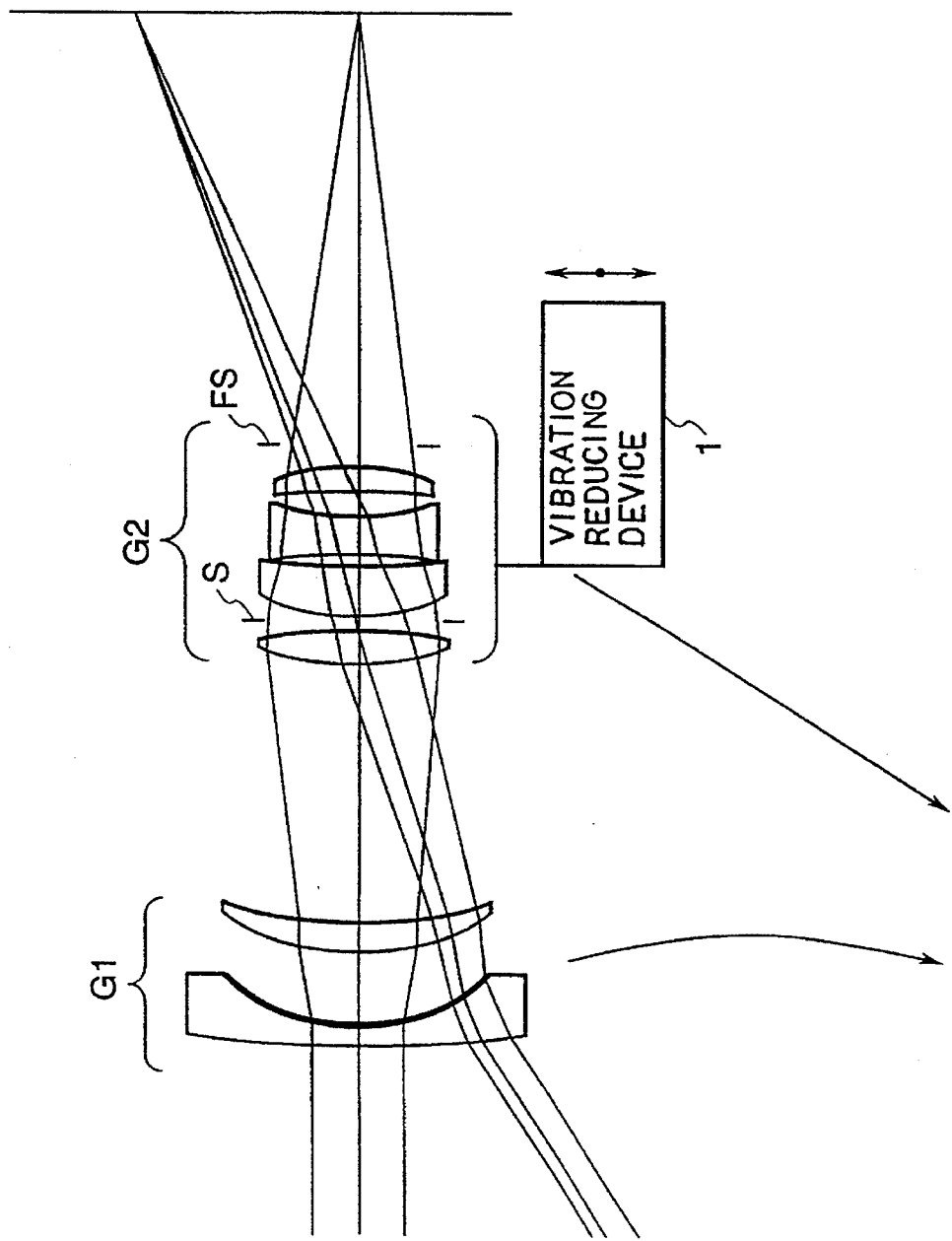
FIG. 3 is a view illustrating a layout of a zoom lens in accordance with a third embodiment of this invention.

FIG. 3 is a view illustrating a layout of the zoom lens in a third embodiment of this invention. The illustrated zoom lens comprises, sequentially from the object side, the first lens group G1 and the second lens group G2. The first lens group G1 is constructed of a negative meniscus lens with a convex surface toward the object side and the positive meniscus lens with a convex surface toward the object side. The second lens group G2 is constructed of a biconvex lens, a positive meniscus lens with a convex surface toward the object side, a biconcave lens and a positive meniscus lens with a concave surface toward the object side. Note that the aperture stop S is provided in the second lens group G2. Further, the fixed flare stop FS is provided between the second lens group G2 and the image plane but closer to the image side of the second lens group G2. The flare stop FS intercepts unnecessary beams of light when the second lens group G2 moves in the direction substantially orthogonal to the optical axis to reduce the vibration.

In the third embodiment illustrated in FIG. 3, an aspherical layer with an aspherical surface toward the image side is provided on the lens surface toward the image side of the first lens element, i.e., the negative meniscus lens which is located closest to the object side and has the convex surface toward the object side. The aspherical layer comprises, for example, a transparent layer.

FIG. 3 shows a positional relationship between the respective lens groups at the wide-angle end. When varying the focal length to the telephoto end, the lens groups move on the optical axis along the zooming loci as indicated by arrowheads in the Figure. The second lens group G2 is properly moved in the direction substantially orthogonal to the optical axis by means of the vibration reducing device 1 defined as the displacing device, thereby correcting the image blur due to the vibrations of the zoom lens.

The zoom lens in the embodiment 3 has the same basic construction as the zoom lens in the embodiment 1 discussed above. Shown therein, however, is an example where the zoom lens is slightly extended on the telephoto side, but the refracting power and the configuration of each lens group are different.

The following Table (3) shows values of data of the embodiment 3 according to the present invention. In Table (3), f represents the focal length, DO is the distance along the optical axis between an object and the lens surface of the zoom lens system closest to the object, $F_{NO}$ is the F-number, $2\omega$ is the view angle, and Bf is the back-focal distance. Further, the numeral at the left end designates the order of each lens surface from the object side, r is the radius of curvature of each lens surface, d is the interval between the lens surfaces, n is the refractive index, and DO is the distance on the optical axis from the object to the lens surface closest to the object side.

TABLE 3

$f = 36.1–77.6$
$F_{NO} = 3.76–5.74$
$2\omega = 64.02°–30.88°$

| | r | d | n |
|---|---|---|---|
| 1 | 89.614 | 1.600 | 1.77279 |
| 2 | 19.099 | 0.070 | 1.49712 |
| 3* | 18.609 | 7.600 | |
| 4 | 23.638 | 2.500 | 1.86074 |
| 5 | 31.182 | (d5 = variable) | |
| 6 | 26.732 | 3.250 | 1.58913 |
| 7 | −90.747 | 1.500 | |
| 8 | 19.302 | 5.200 | 1.51680 |
| 9 | 157.069 | 0.750 | |
| 10 | −53.429 | 3.400 | 1.75520 |
| 11 | 17.930 | 2.100 | |
| 12 | −357.871 | 2.450 | 1.68893 |
| 13 | −26.419 | (Bf) | |

(Aspherical Data)

| | k | $C_2$ | $C_4$ |
|---|---|---|---|
| 3 | 1.0000 | 0.0000 | $-5.2960 \times 10^{-6}$ |

| | $C_6$ | $C_8$ | $C_{10}$ |
|---|---|---|---|
| 3 | $1.4230 \times 10^{-8}$ | $-1.7320 \times 10^{-10}$ | $7.1890 \times X\ 10^{-13}$ |

(Variable Interval in Varying Focal Length)

| f | 36.083 | 77.608 |
|---|---|---|
| DO | ∞ | ∞ |
| d5 | 26.284 | 0.992 |
| Bf | 46.829 | 77.572 |

(Condition Corresponding Values)

$f2 = 35.535$
$fW = 36.083$
$fT = 77.608$
$\Delta Smax = 0.099$
$r_- = 17.93$
$f2_- = -17.420$
$f2_+ = 35.413$ (2) $\Delta Smax/f2 = 0.0028$
(3) $f2/(fW \cdot fT)^{1/2} = 0.672$
(5) $f2_+/f2 = 0.9966$
(6) $q = 0.5449$
(7) $n_+ = 1.58913$
(8) $|f2_-|/f2 = 0.4903$
(9) $r_-/f2 = 0.505$ TABLE 3-continued (Reduced Vibration Data)

| | Wide-Angle End | Telephoto End |
|---|---|---|
| Moving Quantity of Second Lens Group in Direction Orthogonal to Optical Axis (mm) | 0.069 | 0.099 |
| Image Moving Quantity (mm) | 0.120 | 0.259 |

[Fourth Embodiment]

FIG. 4 is a view illustrating a layout of the zoom lens in a fourth embodiment of this invention. The illustrated zoom lens comprises, sequentially from the object side, the first lens group G1 and the second lens group G2. The first lens group G1 is constructed of a negative meniscus lens with a convex surface toward the object side and a positive meniscus lens with a convex surface toward the object side. The second lens group G2 is constructed of a biconvex lens, a biconvex lens, a biconcave lens and a positive meniscus lens with a convex surface toward the object side. Note that the aperture stop S is provided in the second lens group G2. Further, the fixed flare stop FS is provided between the second lens group G2 and the image plane but closer to the image side of the second lens group G2. The flare stop FS intercepts unnecessary beams of light when the second lens group G2 moves in the direction substantially orthogonal to the optical axis to reduce the vibration.

FIG. 4 shows a positional relationship between the respective lens groups at the wide-angle end. When varying the focal length to the telephoto end, the lens groups move on the optical axis along the zooming loci as indicated by arrowheads in the Figure. The second lens group G2 is properly moved in the direction substantially orthogonal to the optical axis by means of the vibration reducing device 1 defined as the displacing device, thereby correcting the image blur due to the vibrations of the zoom lens.

The zoom lens in the embodiment 4 has the same basic construction as the zoom lens in the embodiment 1 discussed above. Shown therein, however, is an example where the zoom lens is slightly extended on the wide-angle and telephoto sides, but the refracting power and the configuration of each lens group are different.

The following Table (4) shows values of data of the embodiment 4 according to the present invention. In Table (4), f represents the focal length, DO is the distance along the optical axis between an object and the lens surface of the zoom lens system closest to the object, $F_{NO}$ is the F-number, $2\omega$ is the view angle, and Bf is the back-focal distance. Further, the numeral at the left end designates the order of each lens surface from the object side, r is the radius of curvature of each lens surface, d is the interval between the lens surfaces, n is the refractive index, and DO is the distance on the optical axis from the object to the lens surface closest to the object side.

TABLE 4

$f = 28.8-77.6$
$F_{NO} = 3.40-5.81$
$2\omega = 76.52°-30.88°$

| | r | d | n |
|---|---|---|---|
| 1 | 98.649 | 2.200 | 1.77279 |
| 2* | 17.777 | 7.977 | |
| 3 | 27.222 | 3.800 | 1.80458 |
| 4 | 43.912 | (d4 = variable) | |
| 5 | 26.406 | 3.500 | 1.64000 |
| 6 | −169.878 | 1.400 | |
| 7 | 22.198 | 3.750 | 1.51680 |
| 8 | 269.188 | 0.700 | |
| 9 | −65.583 | 7.000 | 1.79504 |
| 10 | 18.649 | 1.350 | |
| 11 | 141.028 | 2.600 | 1.64831 |
| 12 | −30.106 | (Bf) | |

(Aspherical Data)

| | k | $C_2$ | $C_4$ |
|---|---|---|---|
| 2 | 0.6882 | 0.0000 | $-8.9347 \times 10^{-7}$ |

| | $C_6$ | $C_8$ | $C_{10}$ |
|---|---|---|---|
| 2 | $-4.0061 \times 10^{-9}$ | $8.9063 \times 10^{-12}$ | $-1.0979 \times X\ 10^{-13}$ |

(Variable Interval in Varying Focal Length)

| f | 28.800 | 77.608 |
|---|---|---|
| D0 | ∞ | ∞ |
| d4 | 39.279 | 0.99261 |
| Bf | 42.575 | 79.742 |

(Condition Corresponding Values)

$f2 = 36.544$
$fW = 28.800$
$fT = 77.608$
$\Delta Smax = 0.099$
$r_- = 18.649$
$f2_- = -17.615$
$f2_+ = 35.959$ (2) $\Delta Smax/f2 = 0.002709$
(3) $f2/(fW \cdot fT)^{1/2} = 0.773$
(5) $f2_+/f2 = 0.98399$
(6) $q = 0.7309$
(7) $n_+ = 1.64000$
(8) $|f2_-|/f2 = 0.4820$
(9) $r_-/f2 = 0.510$ (Reduced Vibration Data)

| | Wide-Angle End | Telephoto End |
|---|---|---|
| Moving Quantity of Second Lens Group in Direction Orthogonal to Optical Axis (mm) | 0.060 | 0.099 |
| Image Moving Quantity (mm) | 0.096 | 0.259 |

Note that this embodiment adopts a method of reducing the vibration by moving the whole second lens group G2 in the direction orthogonal to the optical axis with the aid of the vibration reducing device 1 serving as the displacing device. It is, however, apparent that the action and effect of the present invention can be exhibited even by moving only a part of or the lenses of the second lens group G2. For example, in the first embodiment, the lens group which moves in a direction traversing the optical axis can be adapted to both the biconvex lens and a cemented lens of the second lens group G2 at the object side of the aperture stop S or the biconvex lens positioned at the most-image side. In the third embodiment, the lens group which moves in a direction traversing the optical axis can be adapted to the biconvex lens which is positioned at the object side of the aperture stop S, lenses between the aperture stop S and the flare stop FS and the meniscus lens at the image side.

It is apparent that, in this invention, a wide range of different working modes can be formed based on the invention without deviating from the spirit and scope of the invention. This invention is not restricted by its specific working modes except being limited by the appended claims.

What is claimed is:

1. A zoom lens system with a function for reducing vibration, said zoom lens system having only two lens groups consisting of, sequentially from an object side:

a first lens group having a negative refracting power; and a second lens group movable along a direction traversing an optical axis and having a positive refracting power, said zoom lens system further including a vibration reducing device which moves said second lens group in the direction traversing the optical axis, thereby correcting an image blur, wherein said first lens group, when varying a focal length from a wide-angle end to a telephoto end, moves along the optical axis so as to depict a non-linear locus, while said second lens group moves toward the object side, said zoom lens system satisfying the following conditions:

$$\Delta Y = (1-\beta_2) \cdot \Delta S$$

$$\Delta Smax/f2 < 0.1$$

$$-0.8 < f1/fT < -0.5$$

where $\Delta S$: the moving quantity for stabilizing the image of said second lens group, $\beta_2$: the imaging magnification of said second lens group, $\Delta Y$: the image moving quantity corresponding to the movement of said second lens group, $\Delta Smax$: the maximum displacement quantity which can be taken by said second lens group when correcting the image blur, f1: the focal length of said first lens group, f2: the focal length of said second lens group, and fT: the focal length of the zoom lens system at the telephoto end.

2. The zoom lens system with the function for reducing vibration according to claim 1, wherein said zoom lens system is constructed to satisfy the following condition:

$$0.3 < f2/(fW \cdot fT)^{1/2} < 1.2$$

where fW: the focal length of said zoom lens system at the wide-angle end.

3. The zoom lens system with the function for reducing vibration according to claim 1, wherein said second lens group comprises a convex lens element positioned closest to the object side in said second lens group and satisfies the following condition:

$$0.7 < f2_+/f2 < 2$$

where $f2_+$ : the focal length of said convex lens element positioned closest to the object side in said second lens group.

4. The zoom lens system with the function for reducing vibration according to claim 1, wherein said second lens group comprises a convex lens element positioned closest to the object side in said second lens group and satisfies the following conditions:

$$0 < q < 1$$

$$q = (rb + ra)/(rb - ra)$$

where ra : the radius of curvature of a lens surface, toward the object side, of said convex lens element positioned closest to the object side in said second lens group, and rb : the radius of curvature of a lens surface, toward an image side, of said convex lens element positioned closest to the object side in said second lens group.

5. The zoom lens system with the function for reducing vibration according to claim 1, wherein said second lens group comprises a convex lens element positioned closest to the object side in said second lens group and satisfies the following condition:

$$1.45 < n_+$$

where $n_+$ is refractive index of the material for composing said convex lens element.

6. The zoom lens system with the function for reducing vibration according to claim 1, wherein said second lens group comprises a concave lens element positioned closest to an image side in said second lens group and satisfies the following condition:

$$0.3 < |f2_-|/f2 < 1.5$$

where $f2_-$ : the focal length of said concave lens element positioned closest to the image side in said second lens group.

7. The zoom lens system with the function for reducing vibration according to claim 1, wherein said second lens group comprises a concave lens element positioned closest to the image side in said second lens group and satisfies the following conditions:

$$0.2 < r_-/f2 < 1$$

where $r_-$ : the radius of curvature of the lens surface, toward the image side, of said concave lens element positioned closest to the image side in said second lens group.

8. The zoom lens system with the function for reducing vibration according to claim 1, wherein said second lens group is constructed to satisfy the following condition:

$$-1.8 < \beta_2 < -0.4.$$

9. The zoom lens system with the function for reducing vibration according to claim 1, wherein said zoom lens system satisfies the following condition:

$$fT < 100 \text{ mm}.$$

10. The zoom lens system with the function for reducing vibration according to claim 1, wherein said first lens group comprises a negative meniscus lens element with a convex surface toward the object side and a positive meniscus lens element with a convex surface toward the object side, and an image-side lens surface of said negative meniscus lens element has an aspherical shape.

11. The zoom lens system with the function for reducing vibration according to claim 1, wherein said second lens group comprises, sequentially from the object side:

a positive lens element, a positive lens element, a negative lens element, and a positive lens element; and a refractive index of a material for composing said negative lens element is larger than 1.7.

12. The zoom lens system with the function for reducing vibration according to claim 1, further comprising a flare stop disposed on the image side of said second lens group, said flare stop being fixed in the direction traversing the optical axis.

13. The zoom lens system with the function for reducing vibration according to claim 1, wherein said zoom lens system satisfies the following condition:

$$0.35 < f2/fT < 0.6.$$

14. A zoom lens system with a function for reducing vibration, said zoom lens system having only two lens groups consisting of, sequentially from an object side:

a first lens group having a negative refracting power; and a second lens group movable along a direction traversing an optical axis for stabilizing an image and having a positive refracting power, wherein said first lens group, when varying a focal length from a wide-angle end to a telephoto end, moves along the optical axis so as to depict a non-linear locus, while said second lens group moves toward the object side, said zoom lens system satisfying the following conditions:

$$\Delta Y = (1 - \beta_2) \cdot \Delta S$$

$$\Delta Smax/f2 < 0.1$$

$$-0.8 < f1/fT < -0.5$$

where $\Delta S$: the moving quantity for stabilizing the image of said second lens group, $\beta_2$ : the imaging magnification of said second lens group, $\Delta Y$: the image moving quantity corresponding to the movement of said second lens group, $\Delta Smax$: the maximum displacement quantity which can be taken by said second lens group when correcting an image blur, f1: the focal length of said first lens group, f2: the focal length of said second lens group, and fT: the focal length of the zoom lens system at the telephoto end.

15. The zoom lens system with the function for reducing vibration according to claim 14, wherein said zoom lens system is constructed to satisfy the following condition:

$-1.8 < \beta_2 < -0.4$.

16. The zoom lens system with the function for reducing vibration according to claim 14, wherein said zoom lens system satisfies the following condition:

$0.35 < f2/fT < 0.6$.

17. A zoom lens system with a function for reducing vibration, said zoom lens system having only two lens groups consisting of, sequentially from an object side:

a first lens group having a negative refracting power; and a second lens group having a positive refracting power, said first lens group moving along an optical axis so as to depict a non-linear locus when varying a focal length from a wide-angle end to a telephoto end, said second lens group moving toward the object side, wherein said zoom lens system further includes a vibration reducing device, which is connected to said second lens group, for reducing image blur by moving said second lens group in a direction traversing the optical axis, and satisfies the following conditions:

$\Delta Y = (1-\beta_2) \cdot \Delta S$ $\Delta Smax/f2 < 0.1$ $-0.8 < f1/fT < -0.5$ where $\Delta S$: the moving quantity for stabilizing the image of said second lens group, $\beta_2$: the imaging magnification of said second lens group, $\Delta Y$: the image moving quantity corresponding to the movement of said second lens group, $\Delta Smax$: the maximum displacement quantity which can be taken by said second lens group when correcting an image blur, f1: the focal length of said first lens group, f2: the focal length of said second lens group, and fT: the focal length of the zoom lens system at the telephoto end.

18. A zoom lens system with a function for reducing vibration, said zoom lens system having only two lens groups consisting of, in the order from an object side:

a first lens group having a negative refractive power, and a second lens group having a positive refractive power, wherein said first lens group and said second lens group, when varying a focal length from a wide-angle end to a telephoto end, move along an optical axis, said second lens group including a positive lens unit, and another lens unit adjacent to the positive lens unit, said positive lens unit moving along a direction traversing the optical axis, and an air space between said positive lens unit and said another lens unit being fixed during varying a focal length, and wherein said zoom lens system satisfies the following condition:

$-0.8 < f1/fT < -0.5$ where f1: the focal length of said first lens group, and fT: the focal length of the zoom lens system at the telephoto end.

19. A zoom lens system with a function for reducing vibration, said zoom lens system having only two lens groups consisting of, sequentially from an object side:

a front lens group having a negative refractive power; and a rear lens group movable in a direction traversing an optical axis and having a positive refractive power, said zoom lens system further including a vibration reducing device which moves said rear lens group in the direction traversing the optical axis, thereby correcting an image blur, wherein said front lens group, when varying a focal length from a wide-angle end to a telephoto end, moves along the optical axis so as to depict a non-linear locus, while said rear lens group moves toward the object side, and said rear lens group being positioned closest to an image side, said zoom lens system satisfying the following conditions:

$\Delta Y = (1-\beta_2) \cdot \Delta S$ $\Delta Smax/f2 < 0.1$ $-0.8 < f1/fT < -0.5$ where $\Delta S$: the moving quantity for stabilizing the image of said rear lens group, $\beta_2$: the imaging magnification of said rear lens group, $\Delta Y$: the image moving quantity corresponding to the movement of said rear lens group, $\Delta Smax$: the maximum displacement quantity which can be taken by said rear lens group when correcting an image blur, f1: the focal length of said front lens group, f2: the focal length of said rear lens group, and fT: the focal length of said zoom lens system at the telephoto end.

* * * * *